March 18, 1941.  J. V. COOK  2,235,476
COMMERCIAL BAKING OVEN
Filed June 19, 1940  6 Sheets-Sheet 1

Inventor:
John V. Cook
By Bair and Freeman
Attorneys

March 18, 1941. J. V. COOK 2,235,476
COMMERCIAL BAKING OVEN
Filed June 19, 1940   6 Sheets-Sheet 6

Patented Mar. 18, 1941

2,235,476

UNITED STATES PATENT OFFICE 2,235,476

COMMERCIAL BAKING OVEN

John V. Cook, Chicago, Ill., assignor to Petersen Oven Company, Chicago, Ill., a corporation of Illinois Application June 19, 1940, Serial No. 341,318

17 Claims. (Cl. 107—63)

The present invention is directed to commercial baking ovens, and more particularly to ovens of the type including a continuously traveling conveyor for continuously transporting food stuffs, such as bread, pastry, and the like, in a predetermined path through the baking chamber of the oven.

In ovens of this general class there frequently develops variations in temperatures of different portions of the baking chamber. Moreover, when the baking operation is continuous the door to the baking chamber by necessity must remain open so that the food stuffs can be continuously loaded onto and off of the conveyor. Due to the fact that the door to the baking chamber remains open, draft conditions are set up within the baking chamber which affect the temperature and the baking operation in certain portions of the baking chamber. Furthermore, during the initial portion of the baking operation a larger amount of heat is absorbed by the food stuffs than during subsequent portions of the baking process, and it is often desirable to compensate, to a certain extent, for the heat loss in the portion of the baking chamber where the initial baking operation takes place.

To overcome the deleterious effects of objectionable draft conditions generally, and also due to the door to the oven chamber remaining continuously open, and to compensate for the high degree of heat absorption by the food stuffs in the portion of the baking chamber where the initial baking operation takes place, I provide a novel and improved heating arrangement by virtue of which the temperatures in both the forward and rearward portions of the baking chamber may be varied and controlled as desired.

Another object of my invention is to provide, in an oven of the character indicated, a novel and improved heating arrangement which permits selective control of the temperatures in the upper and lower portions of the baking chamber.

A further object is to provied an improved oven construction of the character indicated including a transversely extending partition wall, interposed between the upper and lower horizontal runs of the conveyor so as to in effect divide the baking chamber into an upper baking portion and a lower baking portion, together with the provision of a novel heating arrangement by virtue of which the temperatures of said upper and lower chamber portions may be controlled and varied as desired.

Still another object is to provide in an oven construction of the character indicated a transversely extending partition wall interposed between the upper and lower horizontal runs of the conveyor so as to in effect divide the chamber into an upper baking portion and a lower baking portion, together with the provision of a novel heating arrangement by virtue of which the temperatures at opposite ends of the respective upper and lower chamber portions may be selectively controlled and varied as desired.

A still further object of this invention resides in the provision of a novel heating arrangement by virtue of which heated gases may be distributed to flues in certain portions of the oven chamber for obtaining desired temperatures adjacent said portions of the chamber, together with the provision of means for recycling portions of the heated gases through the system for utilizing a maximum portion of the heat energy of said gases.

And still another object of this invention is to provide a partitioned baking chamber, together with a novel heating arrangement including independent heating units for selectively controlling temperatures at different portions in the respective partitioned chambered portions of the baking chamber.

Other objects and advantages of this invention will be apparent from the following description, taken in connection with the accompanying drawings, in which:

The oven construction illustrated in the drawings includes a housing 10, of generally rectangular shape, the walls of which include spaced apart inner and outer sheet metal panels 11 and 12, respectively, between which panels is interposed suitable heat insulating material, as indicated at 13. The baking chamber 14, defined by the walls of the housing, is of elongated rectangular form and the forward end of said chamber is provided with an opening 15 adapted to be closed by a door 16 of conventional form.

It is to be understood that when the baking process is continuous, the door 16 is continuously open so as to permit continuous loading and unloading of the food stuffs into and out of the baking chamber. Mounted to extend longitudinally within the baking chamber is a horizontally disposed endless conveyor, illustrated rather diagrammatically in Figure 1. Said conveyor includes a pair of spaced apart sprocket wheels 18 at the forward end and a pair of spaced apart sprocket wheels 19 at the rearward end, over which pairs of wheels are trained strands of endless chain indicated at 20. Supported between the strands of chain are a multiplicity of trays 22 which are pivotally connected to said chains so as to always assume an upright supporting position. Said trays serve to support the pans of food stuffs during their path of travel through the baking chamber. The forward end of said conveyor is located in such relation to the door opening 15 as to afford convenient access for loading onto and off of the trays 22 of the conveyor.

In order to obtain more perfect control of temperatures within the baking chamber I partition said baking chamber so as to in effect provide an upper baking chamber through which the upper horizontal run of the conveyor travels, and a lower baking chamber through which the lower horizontal run of the conveyor travels. Said partitioning is herein illustrated as comprising a panel 25 of sheet metal extending substantially horizontally and transversely of the baking chamber, intermediate the upper and lower runs of the conveyor, with opposite longitudinal edges thereof connected to the inner walls 11 of the baking chamber. Said partition is of maximum length as determined by the distances between the sprocket wheels at the forward and rearward ends of the baking chamber. The underside of the partition plate 25 desirably is covered by a layer of heat insulating material, as indicated at 27, so as to preclude direct interchange of heat between the upper and lower portions of the baking chamber, throughout the length of the partitioning means.

The novel and improved heating arrangement which constitutes the essence of this invention includes duplicate independent heating systems, one for supplying heat to the upper portion of the baking chamber, the other for supplying heat to the lower portion of the baking chamber. The means for distributing heat in the respective upper and lower portions of the baking chamber is such as to permit selective control for distribution of heat to either the forward or rearward portions of the respective upper and lower portions of the baking chambers as well as the provision of means for selectively controlling the distribution of heat in each of these individual portions of the baking chamber.

Inasmuch as the heating systems for the respective upper and lower portions of the baking chamber are substantially duplicates the heating system for the upper portion of the baking chamber will be first described, and then the heating system for the lower portion of the baking chamber will be described. The reference characters employed in connection with the heating system for the lower portion of the baking chamber will correspond to like elements of the heating system for the upper portion of the baking chamber, with the addition of the exponent "a." It is to be understood, and as will be apparent from the drawings, that the dimensions of certain elements in the heating system for the respective upper and lower portions of the baking chamber may vary somewhat to accommodate the differences in dimensions for the adaptation of the systems to the respective upper and lower portions of the baking chamber.

Figure 1:
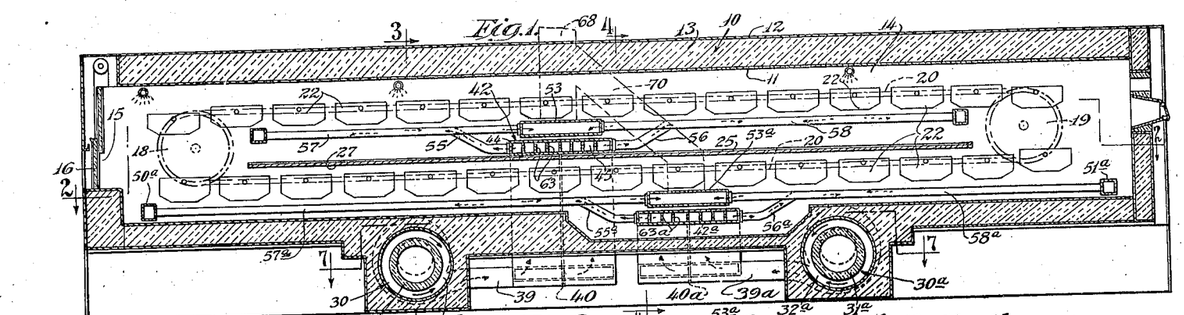
Figure 1 is a longitudinal vertical section through a baking oven embodying the present invention, taken substantially as indicated in line 1—1 of Figure 2.
Figure 2:
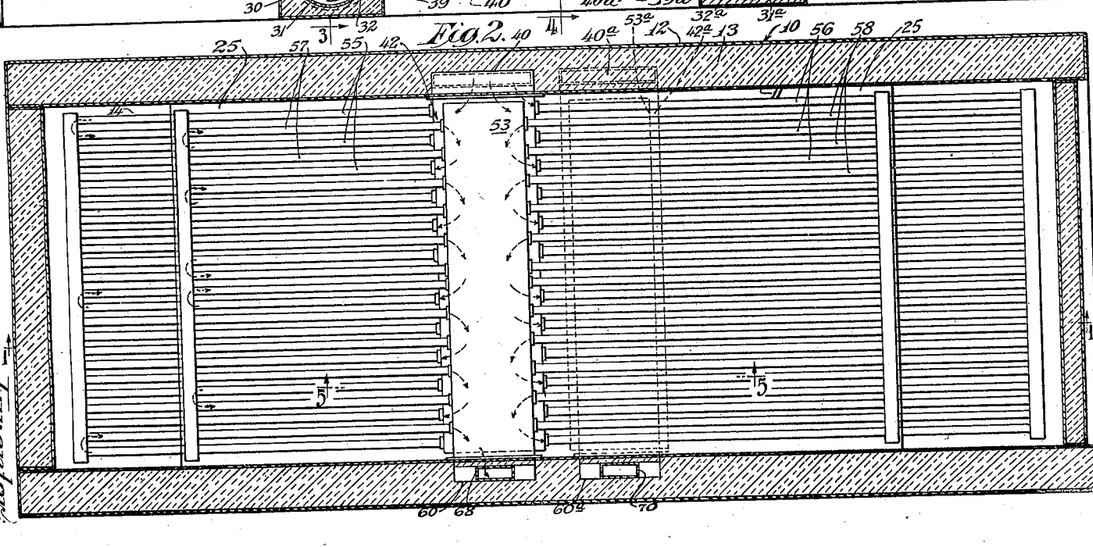
Figure 2 is a horizontal section through the oven, taken substantially as indicated at line 2—2 on Figure 1.
Figure 7:
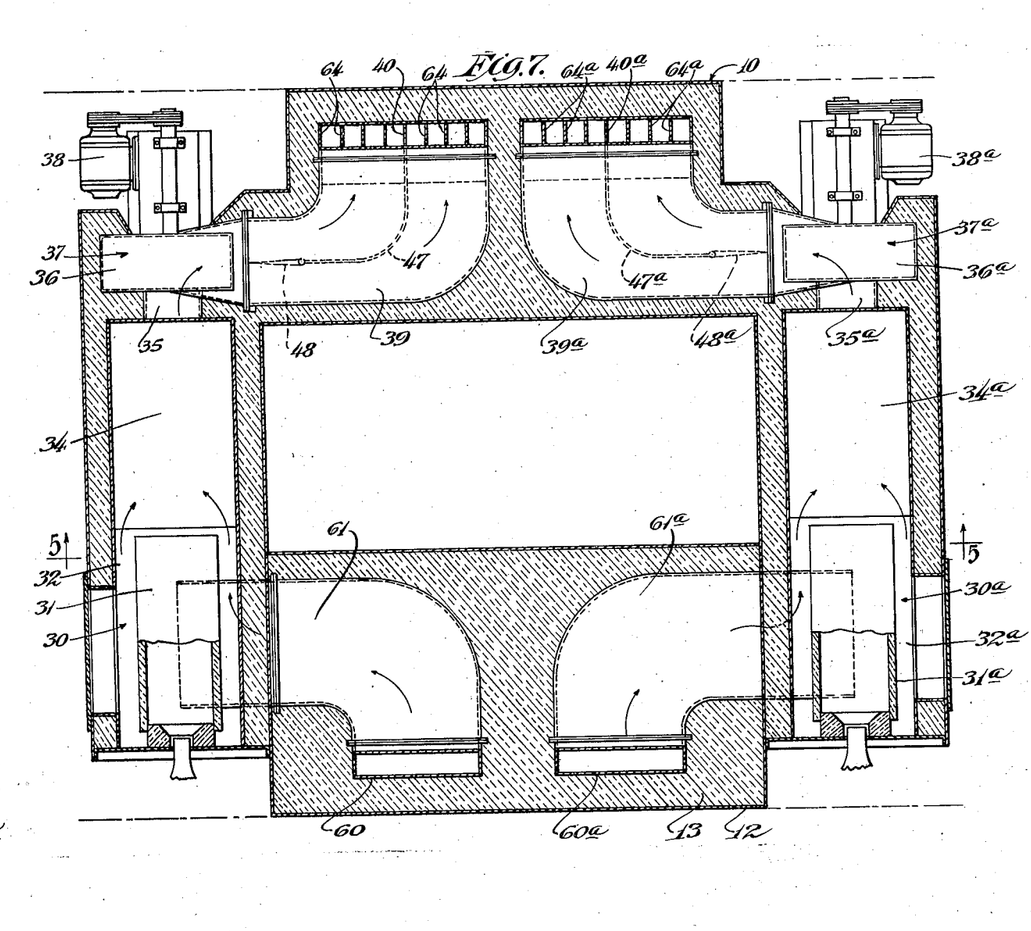
Figure 7 is an enlarged horizontal sectional view through the dual heating units and duct arrangement of the heating system, and taken substantially at line 7—7 on Figure 1.

For convenience the duplicate heating systems which include heat producing units or burners indicated generally at 30 and 30a, as seen in Figures 1 and 7 of the drawings, are arranged in opposite relation, adjacent the central portion of the length of the baking chamber, and serve to produce heated gases for passage through flues in the baking chamber for heating the latter. It is to be understood that the heating unit per se may be a gas burner, or an oil burner or may be of a suitable form for burning coal.

In the construction illustrated the burner unit for the heating system for the upper portion of the baking chamber, includes a tubular housing 31, extending from one side of the housing of the oven into a chamber, indicated at 32, in spaced apart relation to the walls thereof. Said tubular housing may be formed of ceramic or other suitable refractory material. The inner ends of the tubular housing and the chamber 32 open into a mixing chamber 34, the opposite end of which, through a duct 35, communicates with the housing 36, of a blower 37, which is driven by an electric motor, 38, disposed outside of the oven housing, as seen in Figure 7.

Figure 3:
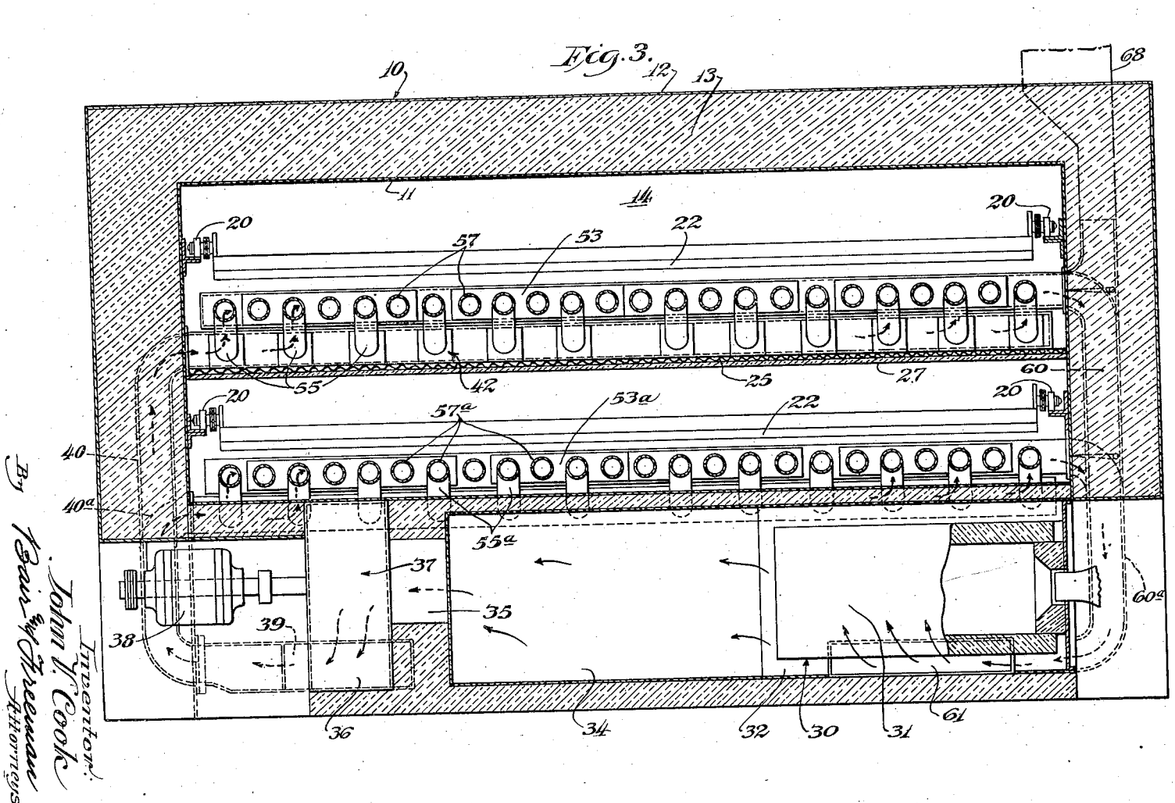
Figure 3 is a transverse vertical section through the oven, cutting through one of the heating units, and taken substantially as indicated at line 3—3 on Figure 1.
Figure 6:
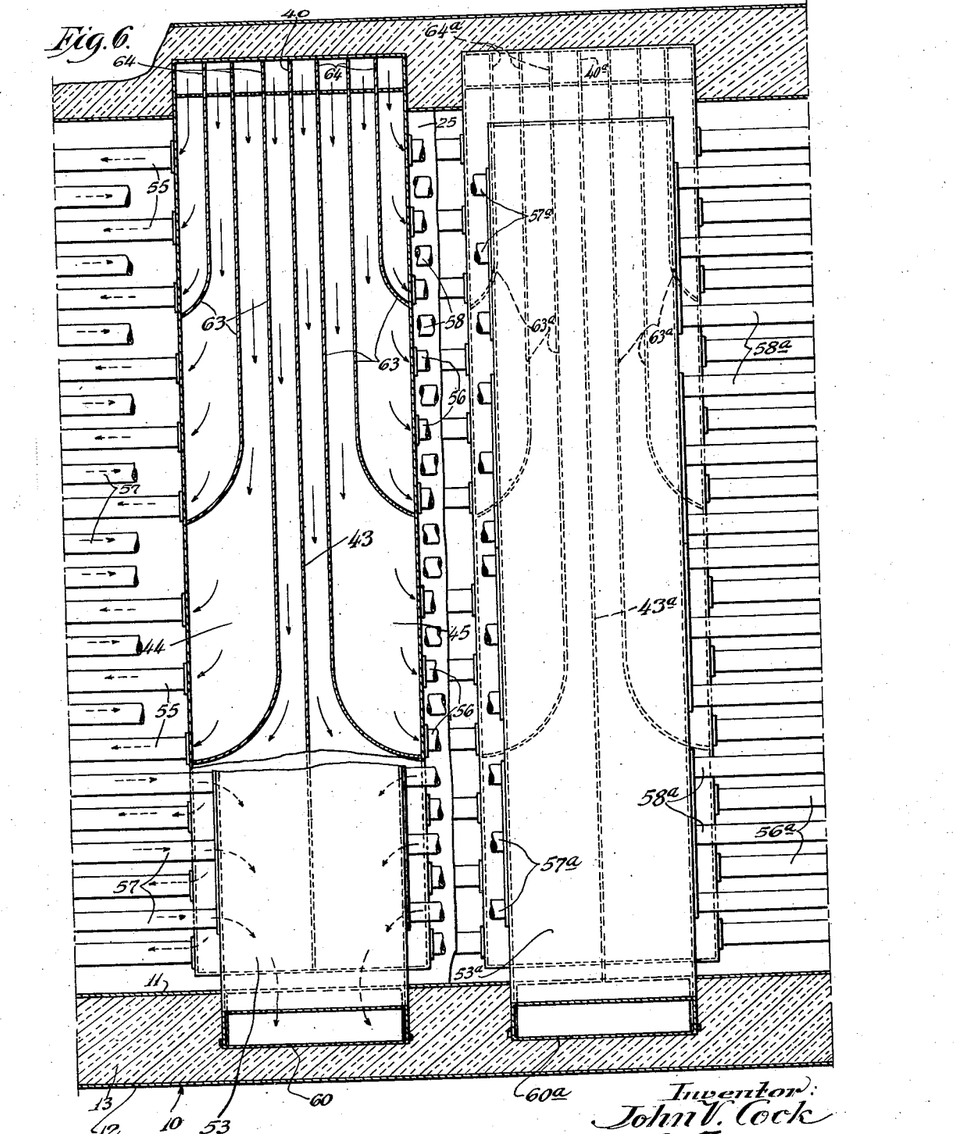
Figure 6 is an enlarged fragmentary horizontal sectional view looking down upon the double supply headers, and taken substantially as indicated at line 6—6 on Figure 5.

The discharge end of the blower housing 36 communicates directly with a horizontally extending duct 39 which extends longitudinally and then laterally toward the adjacent outer wall of the oven housing where it connects directly with a vertically extending double duct 40, disposed within the side wall of the oven housing, as seen in Figures 3, 6 and 7. The upper end of said vertical duct 40 is provided with a return bend, extending into the interior of the upper portion of the oven chamber, above the partition plate 25, as seen in Figures 3 and 6 of the drawings, and communicates directly with a main header 42, which extends transversely across substantially the entire width of the baking chamber, immediately above said partition plate 25. For convenience said main header will be hereinafter termed a double supply header because it is the main header for supplying heat energy for heating of the opposite end portions of the baking chamber. Said double supply header is partitioned longitudinally by a panel 43 to provide two independent oppositely disposed chambers 44 and 45, connected respectively to the separate duct portions of the double duct 40, and serve to supply heat energy respectively and independently to the forward and rearward portions of the upper portion of the baking chamber.

The duct 39 is provided with a partition wall 47 as seen in Figure 7 of the drawings, together with a damper 48 immediately adjacent the outlet of the blower, so as to obtain a proper or desired distribution of the heated gases to the separate portions of the double duct 40 and the respective chambers 44 and 45, for obtaining desired variations in heating conditions in the respective forward and rearward portions of the upper portion of the baking chamber. As for example, as above mentioned, where the oven is in continuous operation so as to necessitate the door 16 remaining in open position, draft conditions within the baking chamber may become such as to necessitate a diversion of a greater amount of the heated gases to certain portions of the baking chamber. Moreover, if the conveyor is operating with the upper run traveling in a direction from the forward end of the oven chamber toward the rearward end then it will be apparent that a greater amount of heat energy may be desired at the forward portion of the baking chamber to compensate for the relatively high absorption of heat energy by the food stuffs during their initial portion of the baking operation.

The heating system also includes a pair of transversely extending intermediate headers 50 and 51 disposed adjacent opposite ends of the baking chamber, preferably adjacent the ends of and above the partition plate 25, and a return header 53, extending transversely of the oven chamber, substantially across the entire width of the baking chamber, and disposed intermediate the main or double supply header 42 and the upper run of the conveyor, as seen in Figures 1 and 3 of the drawings.

The respective chambers 44 and 45 of the main or double supply header are connected to the intermediate headers 50 and 51 by a separate series or bank of longitudinally extending, transversely spaced apart, flues indicated respectively at 55 and 56. Corresponding series or banks of return flues 57 and 58 connect the intermediate headers to the return header 53. The respective series of flues 55 and 57, and 56 and 58 are arranged in alternate relation and are disposed in substantially the same horizontal planes, excepting portions of the flues 55 and 56, immediately adjacent the main header 42, which extend obliquely downward for connection to the respective chambers 44 and 45 of said main header. The end of the return header 53, adjacent the wall opposite the double inlet duct 40, is connected to a vertically extending duct 60 in the adjacent side wall of the oven housing. The lower end of said vertical duct 60 is connected to a horizontally disposed inwardly extending curved duct 61, as seen in Figure 7 of the drawings, the opposite end of which opens into the annular chamber 32 surrounding the housing 31 of the heating unit for admixture in the mixing chamber 34 with the hot gases from the heater unit 30. By virtue of this arrangement the heated gases may be recycled through the heating system, permitting utilization of a desired or major portion of the heat energy thereof.

Figure 5:
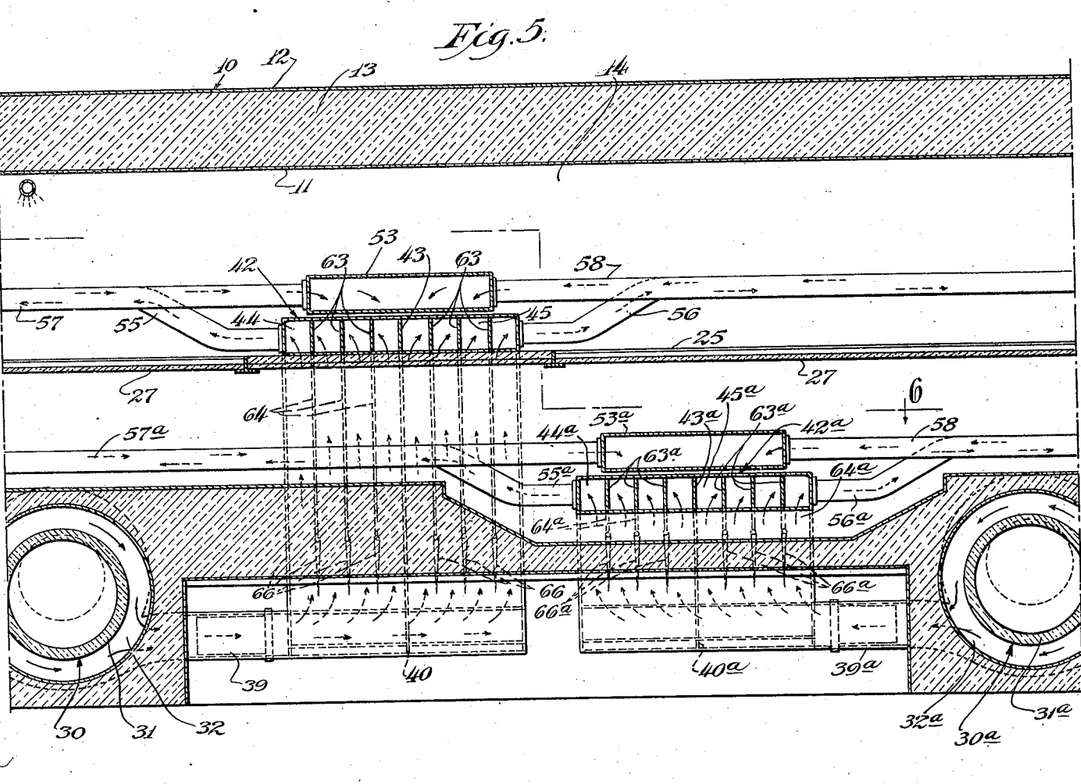
Figure 5 is an enlarged fragmentary, vertical, longitudinal section through the dual heating units, taken substantially as indicated in line 5—5 on Figure 2.

It is to be particularly noted that in the construction described, the streams of heated gases discharged by the blower 37 travel laterally through the duct 39 and thence upwardly in the upright double duct 40 and into the chambers 44 and 45 of the double supply header, and thence through the system of flues to the return header 53, for discharge downwardly in the vertical duct 60 for return to the mixing chamber of the heating unit. The path of travel of the heated air currents are for convenience indicated in the drawings by arrows. In order to assure a relatively uniform distribution of the heated gases into the respective banks or series of flues 55 and 57, 56 and 58, each of the chambers 44 and 45 of the double supply header 42, as seen in Figure 6 of the drawings, is partitioned by means of vanes 63, which are herein shown as three in number forming four compartments, for dividing up the heated gases in each of the chambers 44 and 45 into four streams. Each of the partitioned areas or compartments of the chambers formed by the partition walls 63, communicate directly with a unit number of flues 55 and 56, and as shown each of said compartments is in registration with three flues. It will therefore be apparent that the streams of heated gases are divided so that each unit of flues may be supplied with a desired or predetermined amount of the heated gases available. To further insure that the respective compartments of the chambers 44 and 45 of the main or double supply header receive a proper or desired proportion of the heated gases, each compartment of the vertical duct 40 is similarly partitioned by walls 64 to produce compartments in registration with the compartments in the chambers 44 and 45. In order to compensate for some irregularity in draft conditions in the baking chamber, it may be desired at times to supply an increased or decreased quantity of heated gases to certain units of the flues of the respective series, and for this purpose there are provided dampers 66, at the lower ends of each of the partitions 64 in the vertical double duct 40, as seen in Figure 5 of the drawings. As is apparent, said dampers may be moved for controlling the effective size opening to the respective compartments in said duct 40, which communicate with the compartments in the respective chambers 44 and 45 of the double supply header 42.

The return duct 60, at its upper end, is connected to an upwardly extending duct 68, which it may be understood, connects directly to the stack. It is to be understood that said duct or stack may be provided with a suitable damper for predetermining the amount of heated gases to be discharged therethrough, and thereby control the amount of heated gases to be recycled within the heating system. It is of course apparent that the gases that are returned through the ducts 60 and 61 to the mixing chamber 34 of the heating apparatus, have given up some of their heat during the passage through the flues 55 and 57, 56 and 58, but there is still substantial heat energy retained by said gases, and hence by again mixing with the heated gases produced by the heating apparatus results in an efficient operation of the heating system. It is to be understood that it is desirable to discharge through the duct 68 to the stack only a sufficient amount of the heated gases in order to properly support combustion of the fuel in the heating unit per se.

Figure 4:
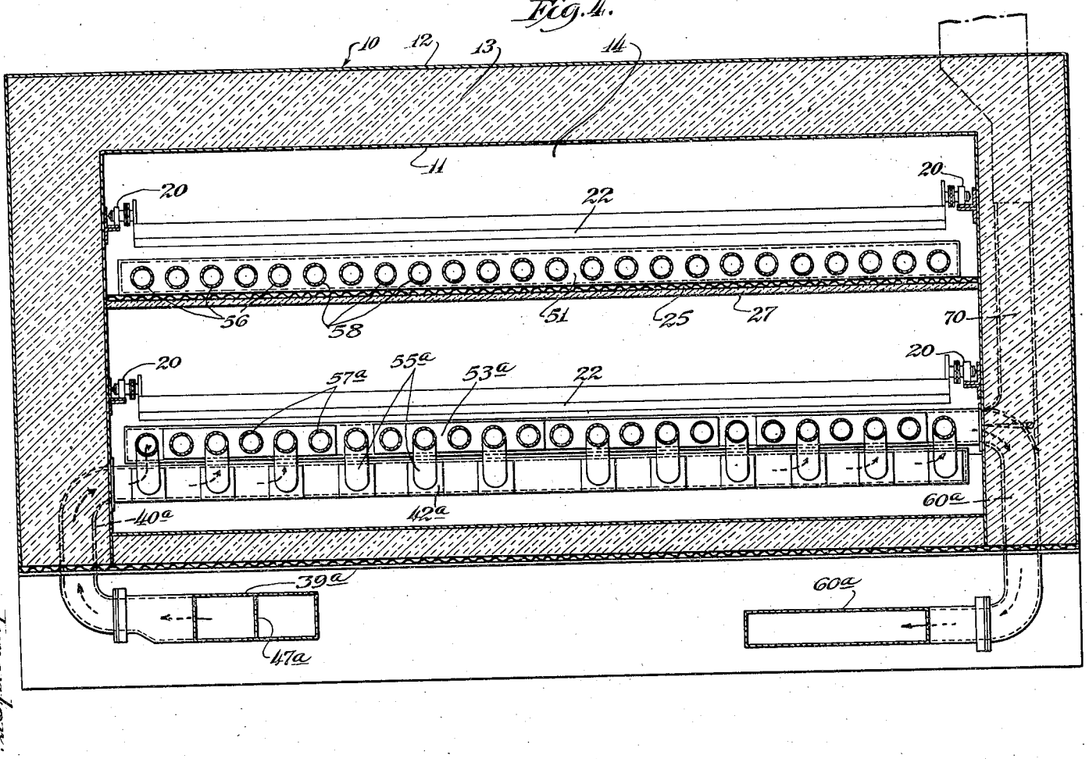
Figure 4 is a transverse vertical section through the oven, taken as indicated in line 4—4 on Figure 1.

The heating system for the lower portion of the baking chamber below the partition wall 25 and surrounding the lower run of the conveyor is substantially a duplicate of the heating system above described. As above mentioned, the corresponding parts of this heating system are accorded similar reference characters together with the exponent "a." In the heating system for the lower portion of the baking chamber, it will be noted that the intermediate headers 50ª and 51ª are located in close proximity to the respective front and rear walls of the baking chamber so that the respective banks of flues 55ª and 57ᵃ and 56ᵃ and 58ᵃ are coextensive with the length of the lower run of the conveyor. The functioning of the heating system for the lower portion of the baking chamber is exactly the same as that described for the upper portion of the baking chamber, and in lieu of providing a separate stack for the discharge of gases from the system, the return duct 60ᵃ is connected at its upper end to a duct 70, which is seen in dot and dash outline of Figure 1 of the drawings, disposed at an oblique angle and merges into the stack duct 68 of the system for heating the upper portion of the baking chamber. The discharge ducts 68 and 70 for connection to the stack are shown in Figures 1 and 4 of the drawings in dot and dash outline, because such structure lies in a plane forwardly of the respective sections represented by said figures of the drawings. It may be understood that suitable thermostats may be disposed in different portions of the baking chamber for controlling the operation of the respective heating systems.

It will now be apparent that by virtue of the structure described, the matter of supplying heat to the forward or rearward portions of either the upper or lower portions of the baking chamber may be selectively controlled. It is therefore possible to obtain desired proportioning of the heat within the baking chamber to compensate for certain conditions, such as irregular draft conditions, within the baking chamber, such as occurs when the door 16 remains in open position, or for compensating for relatively large heat absorption by the foodstuffs during the initial portion of the baking operation. Moreover, by the provision of the dampers 48—48ᵃ and 66—66ᵃ it is possible to control more finely the quantity of heat to be supplied to certain groups of flues in the respective areas of the oven, and more specifically, certain portions of either the forward or rearward portion of either the upper or lower portions of the baking chamber.

Although I have herein shown and described a preferred embodiment of my invention, manifestly it is capable of substantial modification and rearrangement of elements, without departing from the spirit and scope thereof. I do not, therefore, wish to be understood as limiting this invention to the precise form herein disclosed, except as I may be so limited by the appended claims.

I claim as my invention:

1. In a baking oven, the combination of an endless conveyor mounted in the baking chamber and having upper and lower horizontally extending runs, a substantially horizontally extending partition in said chamber, disposed between said upper and lower runs of the conveyor, serving to divide said chamber into upper and lower baking portions, heat producing apparatus, separate heating transmitting means for each of two adjacent longitudinally spaced portions of each of said upper and lower portions of the baking chamber, and control means for predetermining the amount of heat supplied to each of said separate heat transmitting means for controlling the temperatures of the respective portions of the baking chamber.

2. A heating system for a baking oven, comprising in combination a double supply header extending transversely of the baking chamber, intermediate the length of said chamber, said header including two separate chambers, intermediate headers extending transversely of the baking chamber, adjacent opposite ends thereof, a return header extending transversely of the baking chamber intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating the baking chamber, and heating apparatus including ducts for delivering a stream of heated gases to the respective chambers of the double header.

3. A heating system for a baking oven, comprising in combination a double supply header extending transversely of the baking chamber, intermediate the length of said chamber, said header including two separate chambers, intermediate headers extending transversely of the baking chamber, adjacent opposite ends thereof, a return header extending transversely of the baking chamber intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating the baking chamber, heating apparatus including ducts for delivering a stream of heated gases to the respective chambers of the double header, and a duct connecting the return header to said heating apparatus for recycling the heat in the system.

4. A heating system for a baking oven, comprising in combination a double supply header extending transversely of the baking chamber, intermediate the length of said chamber, said header including two separate chambers, intermediate headers extending transversely of the baking chamber, adjacent opposite ends thereof, a return header extending transversely of the baking chamber intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating the baking chamber, heating apparatus including ducts for delivering a stream of heated gases to the respective chambers of the double header, a duct connecting the return header to said heating apparatus for recycling the heat in the system, a stack connected to said last mentioned duct, and a damper in said stack for predetermining the amount of recycling of the heat in the system.

5. A heating system for a baking oven, comprising in combination a double supply header extending transversely of the baking chamber, intermediate the length of said chamber, said header including two separate chambers, intermediate headers extending transversely of the baking chamber, adjacent opposite ends thereof, a return header extending transversely of the baking chamber intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating the baking chamber, heating apparatus including ducts for delivering a stream of heated gases to the respective chambers of the double header, and means in said ducts and chambers of the double supply headers for splitting up said streams of gases and directing parts of the stream to the flues at different portions of the baking chamber.

6. A heating system for a baking oven, comprising in combination a double supply header extending transversely of the baking chamber, intermediate the length of said chamber, said header including two separate chambers, intermediate headers extending transversely of the baking chamber, adjacent opposite ends thereof, a return header extending transversely of the baking chamber intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating the baking chamber, heating apparatus including ducts for delivering a stream of heated gases to the respective chambers of the double header, means in said ducts and chambers of the double supply header for splitting up said streams of gases and directing parts of the stream to the flues at different portions of the baking chamber, and a damper in said ducts for varying the proportion of the heated stream of gases being supplied to the respective chambers of said double supply header.

7. A heating system for a baking oven, comprising in combination a double supply header extending transversely of the baking chamber, intermediate the length of said chamber, said header including two separate chambers, intermediate headers extending transversely of the baking chamber, adjacent opposite ends thereof, a return header extending transversely of the baking chamber intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating the baking chamber, heating apparatus including ducts for delivering a stream of heated gases to the respective chambers of the double header, means in said ducts and chambers of the double supply header for splitting up said streams of gases and directing parts of the stream to the flues at different portions of the baking chamber, and dampers associated with said means for varying the proportion of the heated stream of gases being supplied to the flues at different portions of the baking chamber.

8. A heating system for a baking oven comprising in combination a double supply header extending transversely of the baking chamber, intermediate the length of the chamber, said header including two separate chambers, a return header extending transversely of the baking chamber, intermediate its length, one of said chambers being vertically offset relatively to the other, intermediate headers extending transversely of the baking chamber, adjacent opposite ends thereof, two separate series of spaced apart longitudinally extending flues connecting the respective chambers of the double header to the intermediate headers, two separate series of spaced apart longitudinally extending flues connecting the intermediate headers to the return headers, said flues serving to conduct heated gases from one header to another for heating the baking chamber, the major portion of the length of all of said flues being disposed in substantially the same planes, and heating apparatus including ducts for delivering streams of heated gases to the respective chambers of the double header.

9. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking portions, separate heat transmitting means for each of two adjacent longitudinally spaced portions of each of said upper and lower portions of the baking chamber, separate heat producing means for the heat transmitting means for the respective upper and lower portions of the chamber, and means for predetermining the amount of heat supplied to each of said heat transmitting means for the respective upper and lower portions of the chamber for controlling the temperatures of the spaced portions of the upper and lower portions of the chamber.

10. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking chamber portions, and separate heating means for each of said upper and lower baking chamber portions, each of said heating means comprising a double supply header extending transversely of one of said baking chamber portions, intermediate its length, said header including two separate chambers, intermediate headers extending transversely of said one baking chamber portion, adjacent opposite ends thereof, a return header extending transversely of said one baking chamber portion, intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating said one baking chamber portion, and heating apparatus, including ducts for delivering a stream of heated gases to the respective chambers of the double header.

11. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking chamber portions, and separate heating means for each of said upper and lower baking chamber portions, each of said heating means comprising a double supply header extending transversely of one of said baking chamber portions, intermediate its length, said header including two separate chambers, intermediate headers extending transversely of said one baking chamber portion, adjacent opposite ends thereof, a return header extending transversely of said one baking chamber portion, intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating said one baking chamber portion, heating apparatus, including ducts for delivering a stream of heated gases to the respective chambers of the double header, and a duct connecting the return header to said heating apparatus for recycling the heat in the system.

12. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking chamber portions, and separate heating means for each of said upper and lower baking chamber portions, each of said heating means comprising a double supply header extending transversely of one of said baking chamber portions, intermediate its length, said header including two separate chambers, intermediate headers extending transversely of said one baking chamber portion, adjacent opposite ends thereof, a return header extending transversely of said one baking chamber portion, intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating said one baking chamber portion, heating apparatus, including ducts for delivering a stream of heated gases to the respective chambers of the double header, a duct connecting the return header to said heating apparatus for recycling the heat in the system, a stack connected to the last mentioned duct of each heating means, and a damper in said stack for predetermining the extent of recycling heat in the systems.

13. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking chamber portions, and separate heating means for each of said upper and lower baking chamber portions, each of said heating means comprising a double supply header extending transversely of one of said baking chamber portions, intermediate its length, said header including two separate chambers, intermediate headers extending transversely of said one baking chamber portion, adjacent opposite ends thereof, a return header extending transversely of said one baking chamber portion, intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating said one baking chamber portion, heating apparatus, including ducts for delivering a stream of heated gases to the respective chambers of the double header, and means in said ducts and the chambers of the double header for splitting up said streams of heated gases and directing parts of the stream to flues at different portions of said one baking chamber portion.

14. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking chamber portions, and separate heating means for each of said upper and lower baking chamber portions, each of said heating means comprising a double supply header extending transversely of one of said baking chamber portions, intermediate its length, said header including two separate chambers, intermediate headers extending transversely of said one baking chamber portion, adjacent opposite ends thereof, a return header extending transversely of said one baking chamber portion, intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating said one baking chamber portion, heating apparatus, including ducts for delivering a stream of heated gases to the respective chambers of the double header, means in said ducts and the chambers of the double header for splitting up said streams of heated gases and directing parts of the stream to flues at different portions of said one baking chamber portion, and dampers in said ducts for varying the proportion of the heated stream of gases being supplied to the respective chambers of said double header.

15. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking chamber portions, and separate heating means for each of said upper and lower baking chamber portions, each of said heating means comprising a double supply header extending transversely of one of said baking chamber portions, intermediate its length, said header including two separate chambers, intermediate headers extending transversely of said one baking chamber portion, adjacent opposite ends thereof, a return header extending transversely of said one baking chamber portion, intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating said one baking chamber portion, heating apparatus, including ducts for delivering a stream of heated gases to the respective chambers of the double header, means in said ducts and the chambers of the double header for splitting up said streams of heated gases and directing parts of the stream to flues at different portions of said one baking chamber portion, and dampers associated with said last mentioned means for varying the proportion of the heated stream of gases being supplied to the flues at different portions of said one baking chamber portion.

16. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking chamber portions, and separate heating means for each of said upper and lower baking chamber portions, each of said heating means comprising a double supply header extending transversely of one of said baking chamber portions, intermediate its length, said header including two separate chambers, intermediate headers extending transversely of said one baking chamber portion, adjacent opposite ends thereof, a return header extending transversely of said one baking chamber portion, intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating said one baking chamber portion, heating apparatus including ducts extending upwardly in one wall of the oven and connected to the respective chambers of the double header for supplying streams of heated gases thereto, and a duct extending downwardly in the opposite side wall of the oven and providing a passageway from the return header to said heating apparatus for recycling heat in the system.

17. In a baking oven, the combination of an endless conveyor mounted in the baking chamber and including upper and lower horizontally extending runs, a substantially horizontally disposed partition in said chamber, interposed between said upper and lower runs of the conveyor, serving to divide the chamber into upper and lower baking chamber portions, and separate heating means for each of said upper and lower baking chamber portions, each of said heating means comprising a double supply header extending transversely of one of said baking chamber portions, intermediate its length, said header including two separate chambers, intermediate headers extending transversely of said one baking chamber portion, adjacent opposite ends thereof, a return header extending transversely of said one baking chamber portion, intermediate its length, two separate series of spaced apart longitudinally extending flues connecting the respective chambers of the double header to said intermediate headers, two separate series of spaced apart longitudinally extending flues connecting the intermediate headers to the return header, said flues serving to conduct heated gases from one header to another for heating said one baking chamber portion, the double header being disposed in aligned, vertically spaced relation to the return header, heating apparatus including ducts extending upwardly in one wall of the oven and connected to the respective chambers of the double header for supplying streams of heated gases thereto, and a duct extending downwardly in the opposite side wall of the oven and providing a passageway from the return header to said heating apparatus for recycling heat in the system.

JOHN V. COOK.